PROCESS FOR FLASHING PROPYLENE DILVENT FROM POLYPROPYLENE IN CYCLONE SEPARATOR
Filed April 11, 1963
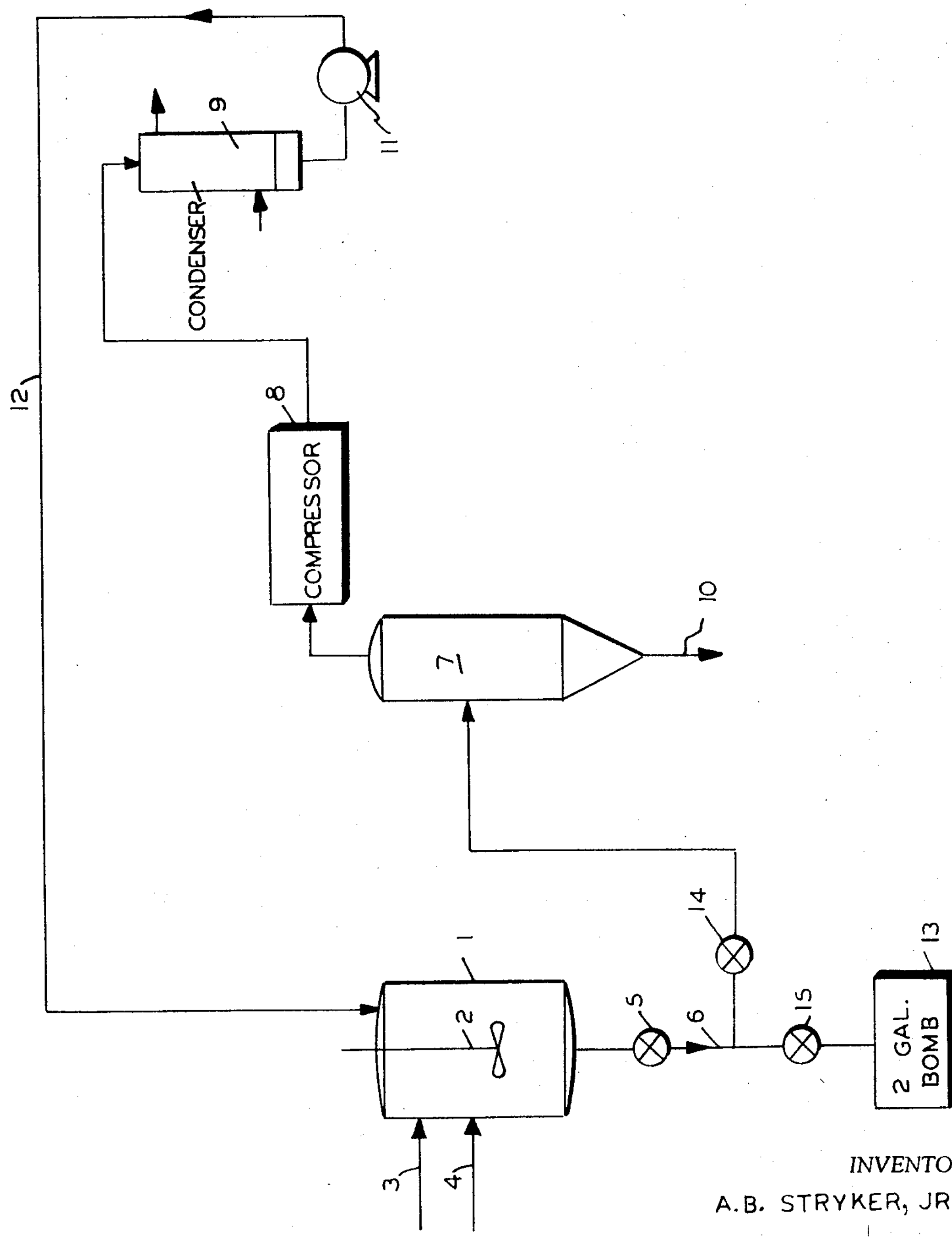
INVENTOR
A.B. STRYKER, JR.
BY William E. Thomas, Jr.
AGENT

United States Patent Office 3,639,374

Patented Feb. 1, 1972

3,639,374

PROCESS FOR FLASHING PROPYLENE DILUENT FROM POLYPROPYLENE IN CYCLONE SEPARATOR

Abner B. Stryker, Jr., Severna Park, Md., assignor to Rexall Drug and Chemical Company, Los Angeles, Calif.

Filed Apr. 11, 1963, Ser. No. 272,449
Int. Cl. C08f *3/08, 3/10*
U.S. Cl. 260—93.7 2 Claims

ABSTRACT OF THE DISCLOSURE

This invention is directed to an improved process for producing polypropylene. In particular, this invention relates to a process for producing polyproplene of low volatile content in a diluent free process.

In the process of this invention for producing highly crystalline polypropylene in which the propylene monomer is contacted with a catalytic amount of a polymerization catalyst in liquid propylene, the improvement resides in removing the propylene diluent from a suspension containing from about 50% to 60% polypropylene in liquid propylene under the autogenous pressure of the system by feeding the suspension to a recovery zone such as a cyclone separator maintained at substantially atmospheric pressure, whereby the propylene diluent is flashed and separated from the solid praticles of the polypropylene, leaving a polypropylene product containing not in excess of about 2% by weight propylene as volatiles, and subsequently recovering the thus treated polypropylene. The monomeric propylene which is flashed off and separated from the polymer within the cyclone is compressed, condensed and recycled to the polymerization reactor. By utilizing this procedure, it is possible to obtain a substantially dry polypropylene product and to conserve the monomeric propylene by achieving maximum conversion of the propylene monomer to the polymer.

Numerous processes for the polymerizatio nof proplyene are known by the prior art (Belgian Pat. 538,792 and U.S. Pats. 2,949,447 and 2,911,384). By the processes described in these patents, propylene is generally contacted under relatively mild conditions of pressure and temperature with a catalyst composition composed of an organo metallic compound of a metal of Groups II and III of the Mendeleeff Periodic Table, such as aluminum, with a halide of a metal of Groups IV*a*, V*a* or VI*a*, such as titanium tri-halide to produce high molecular weight solid crystalline propylene. Such catalysts are known in the art as Ziegler-Natta catalysts. The polymerization is usually carried out in an inert hydrocarbon solvent, but may be conducted in a diluent free process, i.e., one wherein the liquid monomer is its own diluent. When monomeric liquid propylene is used as the diluent, the process is generally referred to as a "liquid pool" process.

Generally, the polypropylene produced by such processes have a molecular weight of from about 50,000 to about 5,000,000 with a major portion of the polymer being crystalline in that it exhibits a crystalline structure by X-ray analysis and is insoluble in heptane. Crystalline polypropylene is well known for its highly desirable properties such as high tensile strength, high modulus of elasticity and good resistance to elevated temperatures.

The numerous advantages to the diluent free or liquid pool propylene polymerization process have been stated in U.S. Pat. 3,002,961. However, since liquid propylene is the diluent for the polymerization system, the percentage of conversion of monomer to polymer and the percent of total volatile content of the polypropylene must be very carefully controlled in order to conserve the propylene by obtaining maximum conversion of the monomer to the polymer. For this reason, it is generally desired to obtain a polymer which contains less than about two weight percent monomer as volatiles. When such is the case, it is readily seen that at least 98% of the monomeric propylene would be converted to the polymer. This result, therefore, is highly desirable.

According to U.S. Pat. No. 3,002,961, the separation of the moonmeric propylene from the polymer can be performed by distilling the propylene from the polymer batch, and condensing in a receiver. The polypropylene would then be removed from the reactor. A dispersing agent for the polypropylene such as an aliphatic hydrocarbon may also be introduced into the reactor during or after the distillation of the monomeric propylene. In this case, a highly viscous mixture would result within the reactor and would have to be removed therefrom. This method has the disadvantage of producing a viscous and tacky polymer within the reactor which will adhere to the wall of the reactor and force a shutdown of the reactor to remove the polymer and to clean the reactor prior to reusing it. Another method of recovering the polymer from the monomeric propylene which is suggested by this patent is that of passing the mixture of polypropylene from the reactor through a pressure filter. In this instance, a certain portion of the soluble atactic polymer and the soluble catalyst components would remain dissolved in the liquid propylene. The soluble polymer would then have to be separated by evaporation of the propylene or the addition of a precipitant. Such a procedure requires the addition of numerous pieces of special equipment, which would greatly increase the cost of the polymerization operation. The additional equipment would also increase the space requirement necessary for a commercial operation. It is therefore desirable to be able to separate the monomeric propylene from the polymer product without the necessity of using this additional equipment.

It is an object of this invention, therefore, to provide an improved process by which polypropylene can be obtained at minimum cost and with a maximum of operational efficiency. Accordingly, it is an object of this invention to separate monomeric propylene from a suspension of polypropylene in propylene by which the above mentioned problems of the prior art are avoided. Other objects, advantages, and features of this invention will be apparent to those skilled in the art in view of the following more detailed description of the invention.

These and other objects are attained by means of the improved process of this invention wherein propylene is polymerized in liquid propylene by contact with a polymerization catalyst to produce a polymer slurry within the reactor; the polymer slurry is removed from the polymerization reactor to a cyclone separator at a percent solid content of approximately 50–60% by weight polypropylene and under the autogenous pressure of this system, whereby the propylene diluent is flashed from the solid particle of the polypropylene leaving a polypropylene product containing not in excess of about 2% propylene by weight as a volatile component. The thus treated polypropylene is subsequently recovered. The propylene monomer which is flashed off in the cyclone separator is passed through a compressor and a condenser and then recycled to the polymerization reactor for further usage therein. The polypropylene is collected at the bottom of the cyclone as a substantially dry polymer product and transported to further processing such as a purification treatment. Thus, the present invention provides a rapid and simple method of separating the polymer from the monomeric propylene diluent by maintaining the solid concentration of the polymer slurry entering the separator, i.e., the percentage of polypropylene in the propylene diluent, within the range of approximately 50% to 60%. When the stream of material entering the cyclone separator is maintained within the range, it is possible to separate completely the monomeric propylene from the polymer product under a pressure of 1 atmosphere within the separator. As indicated, this process will yield a substantially dry polymer and may be conducted in a continuous manner.

The percentage of solids of the polymer-propylene slurry is critical to the success of this invention. The slurry composition must be controlled so as to be at least about 50% by weight solids in order to achieve complete separation of propylene from polypropylene. The upper limit is that necessary to assure effective pumping of the slurry to the cyclone. In practice, this has been found to be approximately 60%.

The invention will be further understood by reference to the accompanying drawing which is schematic of the overall operation. It should be understood that this flow sheet represents only a particular embodiment of the working method of this invention and is therefor no limitation of same.

The process was carried out in a 150 gallon glass lined polymerization vessel 1 of standard construction. The reactor was equipped with an agitator 2, feed lines 3 and 4 for incoming raw materials and discharge conduit 6 for the slurry of polymer product. In the examples of this invention the liquid pool process was utilized for polymerizing propylene.

Suitable amounts of monomer and catalysts are admitted to the reactor through feed lines 3 and 4 respectively. The temperature within the reactor is then brought to the polymerization temperature, 150° F. As the polymerization proceeds, a slurry of polymer and liquid propylene will be formed in the reactor. This will be removed from the reactor through discharge line 6. The polymer slurry will then be forced through line 6 by an automatic discharge valve 5 to a cyclone separator 7 of standard construction equipped with a surrounding jacket for the circulation of a heat transfer medium.

Also shown on the drawing is a two gallon bomb 13 which is connected to discharge line 6. Through proper munipilation of valves 14 and 15, the polymer slurry can be diverted from line 6 to the two gallon bomb. The purpose of using this bomb is to determine the percent solids of the polymer slurry. The determination of the percentage is as follows. The bomb is weighed prior to receipt of the polymer slurry. After the polymer has been admitted to the bomb to substantially fill same, the bomb is weighed again. From the difference in weights, the weight of the polymer can be obtained. The monomeric propylene within the two gallon container would then be boiled off, which would leave only the polymer product. The bomb is then weighed again. The weight of the polymer product can now be obtained using this weight and the weight of the empty bomb. Thus the percent solid can be easily computed using the total weight of the polymer slurry and the weight of the polymer product.

Since it is desired to maintain the percent of solids in the range of 50 to 60%, it is possible to control this in numerous ways. For example, if the percent of solids has increased above the desired level, the amount of catalyst which is being fed into the reactor may be decreased, thereby decreasing the amount of polymer which is being formed within the reactor. Conversely, if the percent solids determination indicates that the percentage is below the requisite 50% mark, the percent of solids may be increased by increasing the amount of catalyst which is being fed into the reactor, thereby forming additional polymer product. Alternatively the percent of solids may be controlled by increasing or decreasing the temperature in the reactor, which would regulate the activity of the catalyst and the amount of polymer being formed. A third way of controlling the percent of solid would be to increase or decrease the duration of the reaction period to compensate for a corresponding increase or decrease in the amount of polymer, that is the percent of solid within the slurry. Thus, after obtaining the percent of solid within the slurry, the percentage would be controlled utilizing one of the above described methods.

When the polymer slurry has passed to the cyclone separator 7, the separation will be performed by flashing the slurry within the separator which is operating substantially at atmospheric pressure. This will yield a substantially dry polymer product at the bottom of the cyclone, while the monomeric propylene will be taken off from the top of the cyclone as a vapor, passed through a compressor 8 wherein it will be compressed to a pressure slightly above that being utilized in the reactor 1, and will subsequently be passed through a condenser 9. The condenser is one of standard construction with a jacketed cooling means through which a cooling medium will be circulated. The condenser will condense the propylene vapor to the liquid phase, and the liquid propylene will be recycled through line 12 to the reactor 1 by means of a recycle pump 11.

A very important advantage of the process of this invention is the fact that no additional heat need be added to the effluent stream entering the cyclone in order to achieve substantially complete separation of the liquid monomer and polymer while operating the cyclone at atmospheric pressure. If the composition of the effluent stream is maintained between 50 and 60% solids by weight, a substantially dry polymer can be obtained which will contain not in excess of 2% by weight of liquid propylene. This invention therefore makes it possible to polymerize propylene in the diluent free process without the necessity of utilizing heat exchange or other equipment for controlling the temperature of the effluent stream as would otherwise be required. Thus, the cost of a commercial polymerization operation is thereby greatly reduced.

The process of this invention will be substantially illustrated by means of the following examples.

EXAMPLE I

Using the system described above, propylene was polymerized in the liquid pool process in a continuous manner. 60 grams per hour of titanium trichloride cocrystallized with aluminum trichloride was added to the reactor which was maintained under a nitrogen atmosphere with stirring. The temperature within the reactor was increased to 150° F. Propylene monomer was next added to the reactor at a rate of 150 pounds per hour. 180 grams per hour of diethyl aluminum chloride cocatalyst was then added to the reactor. 10 p.s.i. of hydrogen was next introduced into the reactor to aid in the control of the molecular weight of the polymer produced. The pressure within the reactor was 410 p.s.i.g. The percent of solids of the slurry formed in the bottom of the reactor was then determined using the 2 gallon bomb as described above. The percent of solid was found to be 52% by weight. The polymer slurry, 52% solids, was then conducted to the cyclone separator which was operating under a pressure of 1 atmosphere. The monomeric propylene was flashed within the cyclone and thereby separated from the polypropylene. The monomeric propylene was then passed through the compressor wherein it was compressed to a pressure slightly above that within the polymerization reactor, and subsequently passed through a condenser wherein it was condensed to the liquid phase and finally recycled to the reactor through the recycle pump 11. The polypropylene was collected in the bottom of the cyclone. After a substantial amount had been collected the polypropylene was removed from the bottom of the cyclone through discharge 10. The polymer was then subjected to a standard analytical test in order to determine the percent of volatile components therein. In this example, the percent of volatiles was measured by 1% by weight.

EXAMPLE II

The procedure of Example I was followed, but in this example the percent solid was determined to be 54%. Within the cyclone, the monomeric propylene was again separated from the polymer product in the same procedure as that used in Example I. After a sufficient amount of polypropylene had collected at the bottom of the cyclone, it was again removed and analyzed for its volatile content. In this example the volatile content was found to be 2% by weight.

EXAMPLE III

The procedure of Examples I and II was followed. In this example the percent solids within the reactor was found to be 58% solid. The monomeric propylene was again separated under a pressure of 1 atmosphere. The product was again permitted to collect at the bottom of the cyclone from which it was removed after a sufficient amount had been collected. This product was again analyzed for its volatile content. The volatile content of this example was found to be 1.5% by weight.

EXAMPLE IV

The procedure of the above examples was again followed. In order to demonstrate the significance of the percent of solids of the stream entering the cyclone separator, this run was conducted utilizing 24% solids by weight. The slurry of polymer was then conducted into the cyclone separator wherein the propylene was flashed from the polypropylene. The polymer was then permitted to collect on the bottom of the cyclone, from which it was removed after a sufficient amount had collected. The polymer product was again analyzed for its volatile content. The volatile content of this product was found to be 20 weight percent.

EXAMPLE V

The procedure of Examples I through IV was again followed. In this example, the percent of solids of the stream entering the cyclone was 28% by weight. The monomeric propylene was again flashed from the polymer within the cyclone separator. The polypropylene was collected on the bottom of the cyclone and was removed therefrom after a sufficient amount had collected. An analysis of the polymer product showed that the product contained 20% by weight total volatiles.

EXAMPLE VI

The procedure of the previous examples was followed. The percent of solids of the stream entering the cyclone was 43 weight percent. After the liquid propylene was flashed off, the polypropylene was collected on the bottom of the cyclone and removed therefrom after a sufficient amount had collected. An analysis of the polymer showed that the product contained 4% by weight total volatiles.

The results of this invention clearly indicate that it is possible to produce a polymer product which contains a volatile content of only about 2% or less. These results are obtained simply by controlling the percent solids of the slurry of polymer being fed into the cyclone separator so as to have a percentage of from about 50%–60% solids by weight. When this condition exists, it is possible to separate the monomeric propylene from the polymer utilizing a pressure of only 1 atmosphere within the cyclone. By this process, the unreacted monomeric propylene will be substantially completely separated from the polymer product. Thereafter, the monomeric propylene may be compressed, condensed, and recycled to the reactor for further usage in the polymerization process. Thus, by the improved method of this invention, a substantially dry polymer product may be obtained and the maximum usage of the propylene monomer can be obtained.

It is to be understood that many equivalent modifications will be apparent to those skilled in the art from the reading of the foregoing disclosure without a departure from the intended concept of the invention. For example, although a continuous process has been described, a batch type process may be employed and is intended to be within the bounds of this invention.

I claim:

1. The process of removing propylene diluent from a suspension consisting essentially of from about 50%–60% by weight polypropylene in liquid propylene obtained directly from a propylene polymerization reactor under the autogenous pressure of the reactor which consists essentially in feeding the said suspension from the reactor to a recovery zone of the cyclone type maintained at substantially atmospheric pressure, whereby propylene diluent is flashed from the solid particles of polypropylene, leaving on said particles not in excess of about 2% by weight propylene, and recovering the thus treated polypropylene.

2. The process of claim 1 wherein the propylene diluent, after its removal from the polypropylene, is compressed, condensed and recycled to the polymerization reactor for further usage therein.

References Cited

UNITED STATES PATENTS

| | | | |
|---|---|---|---|
| 3,197,453 | 7/1965 | Harban | 260—94.9 F |
| 3,010,948 | 11/1961 | Field et al. | 260—94.9 F |
| 3,125,560 | 3/1964 | Rose | 260—94.9 F |

JOSEPH L. SCHOFER, Primary Examiner

W. F. HAMROCK, Assistant Examiner

U.S. Cl. X.R.

260—94.9 F